Feb. 14, 1928.
W. T. FOULTZ ET AL
1,659,357
COMPUTING MACHINE
Filed June 15, 1923      10 Sheets-Sheet 8
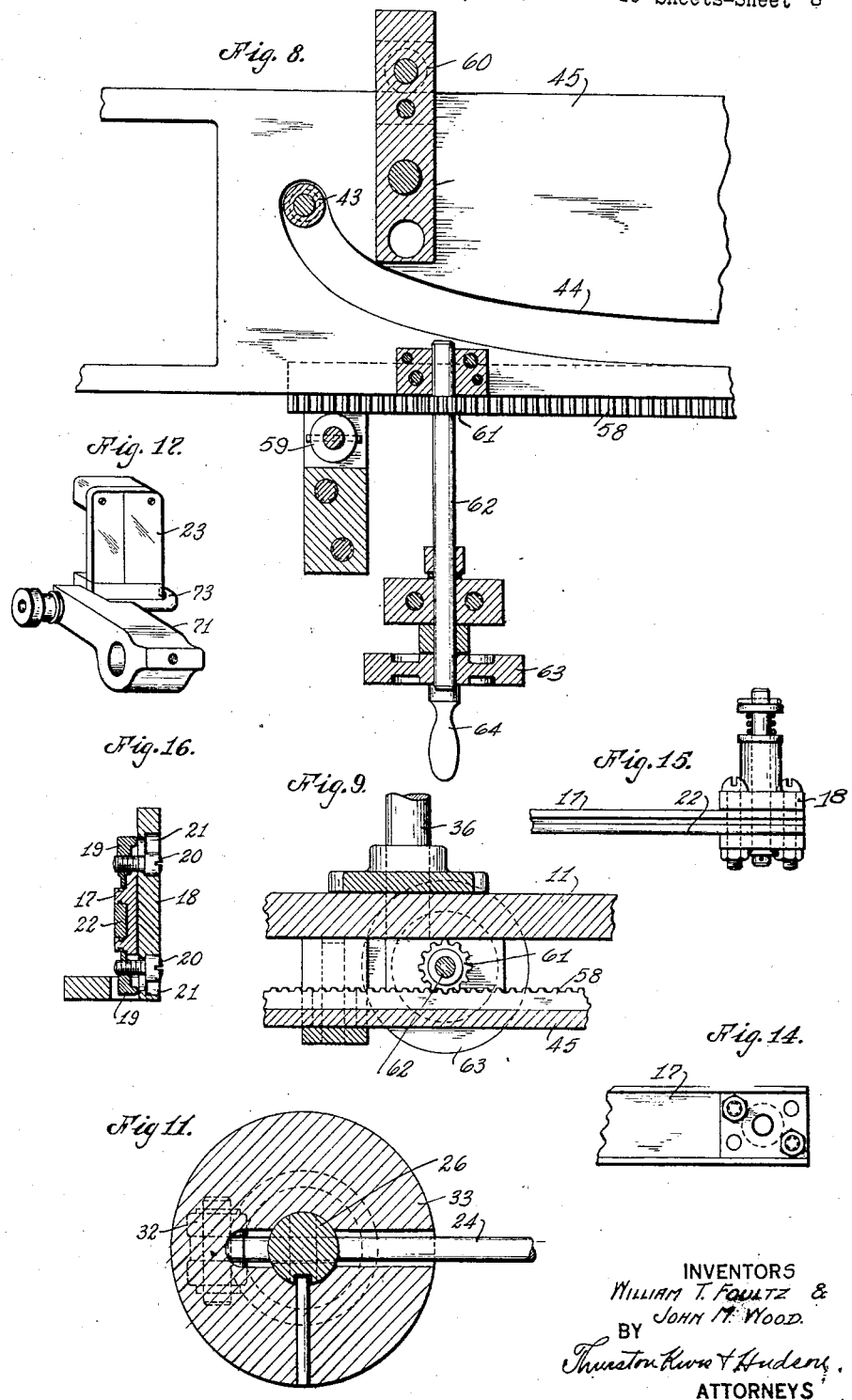

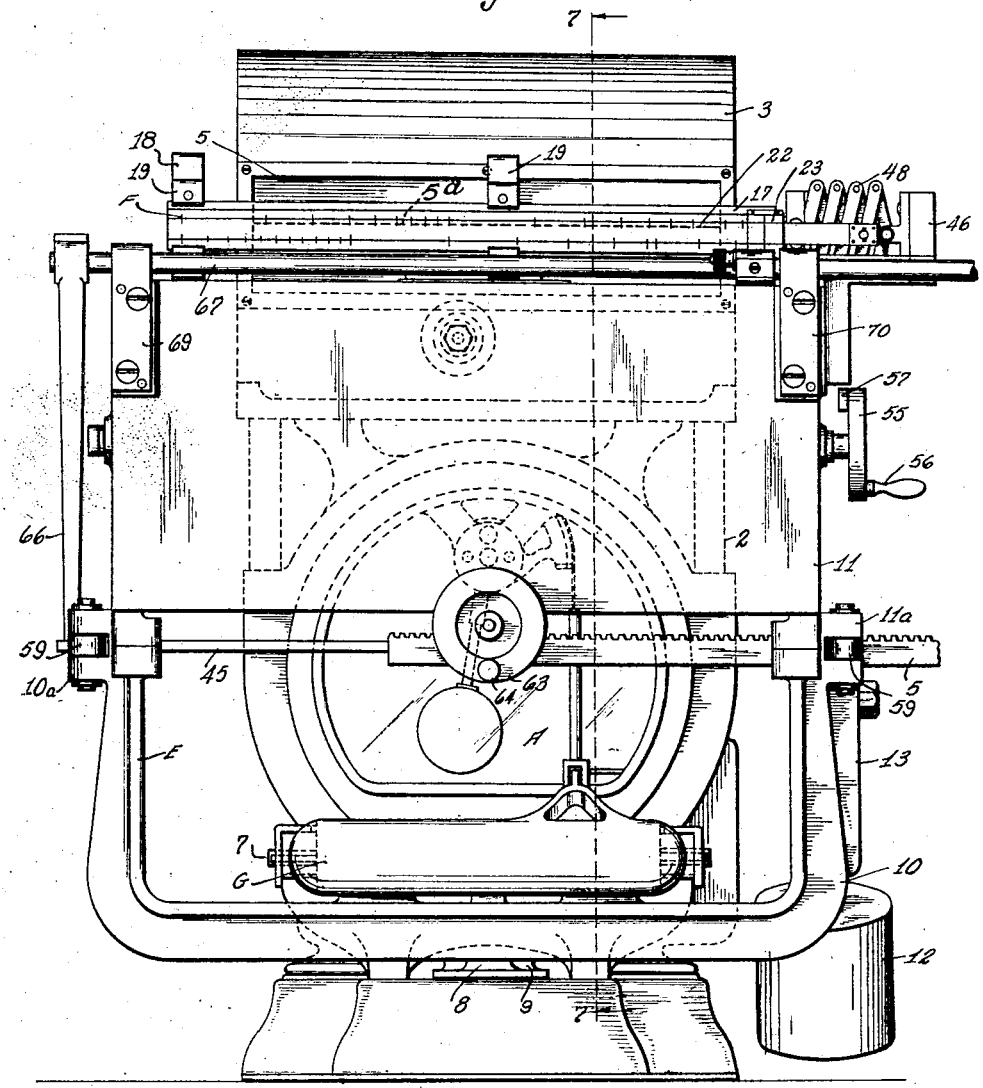

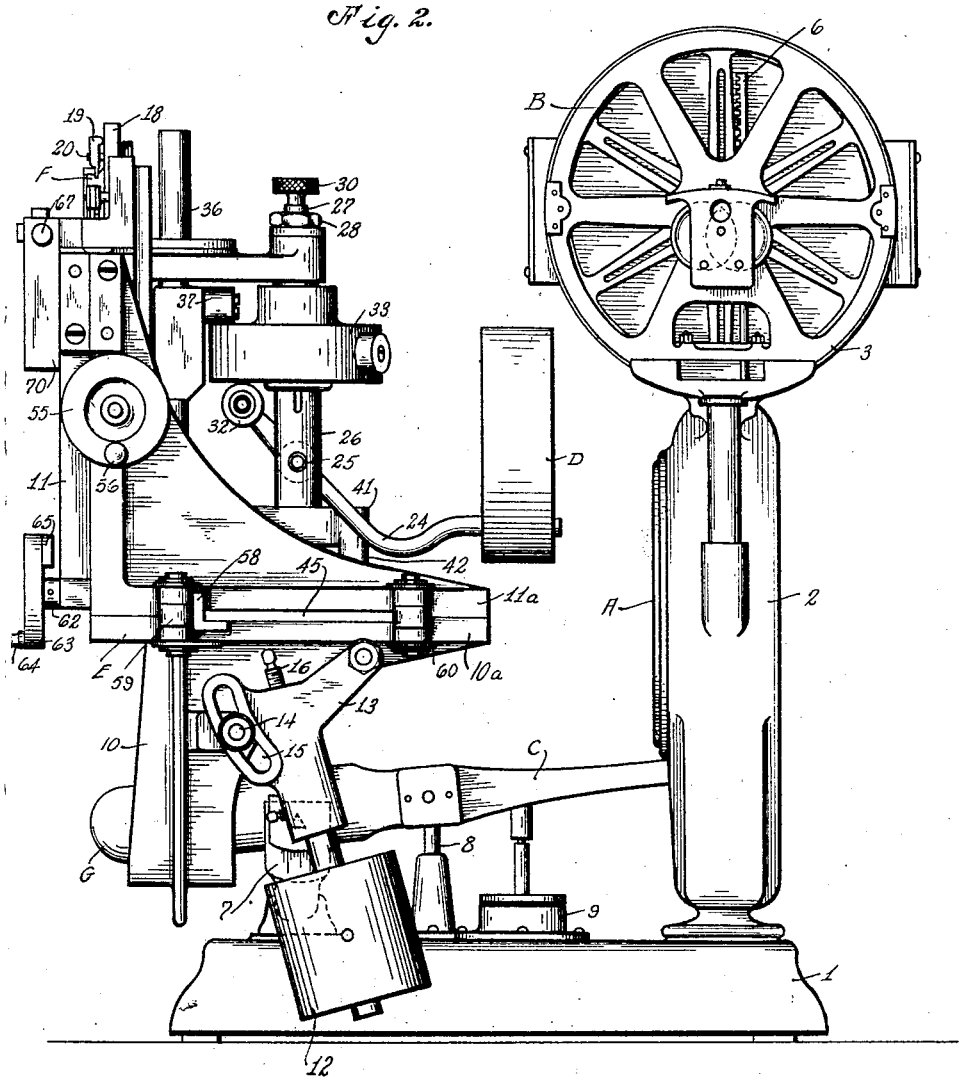

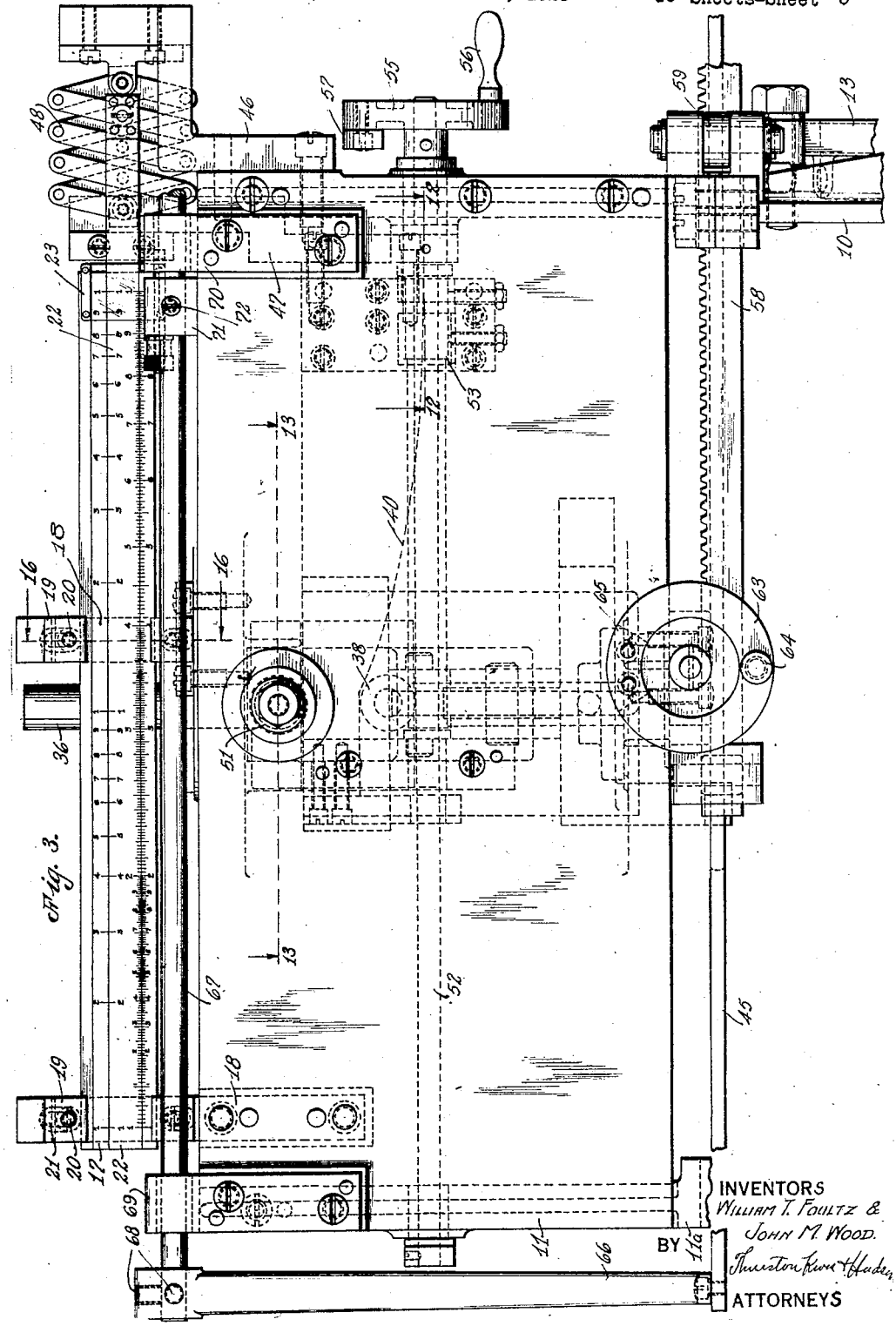

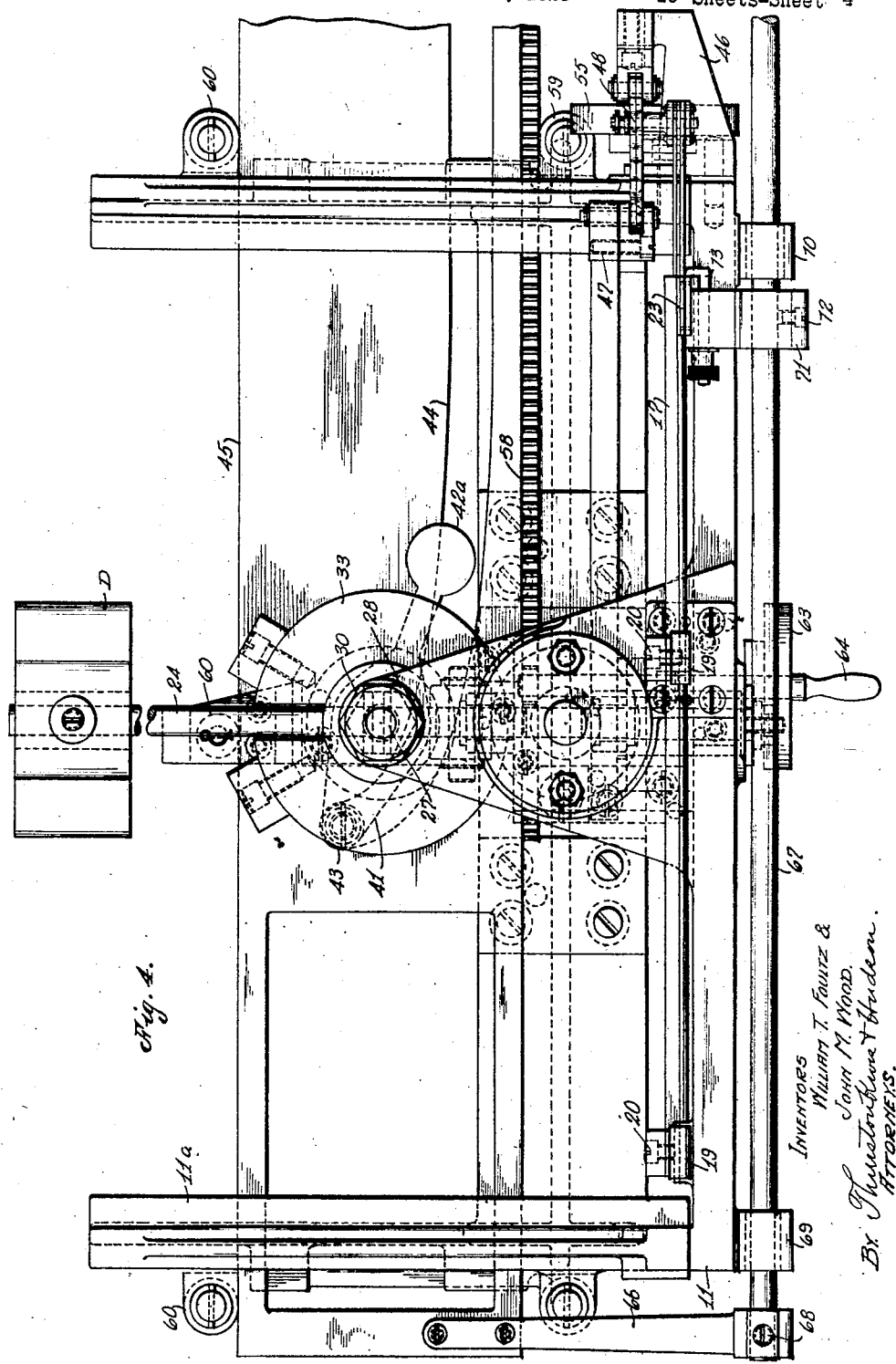

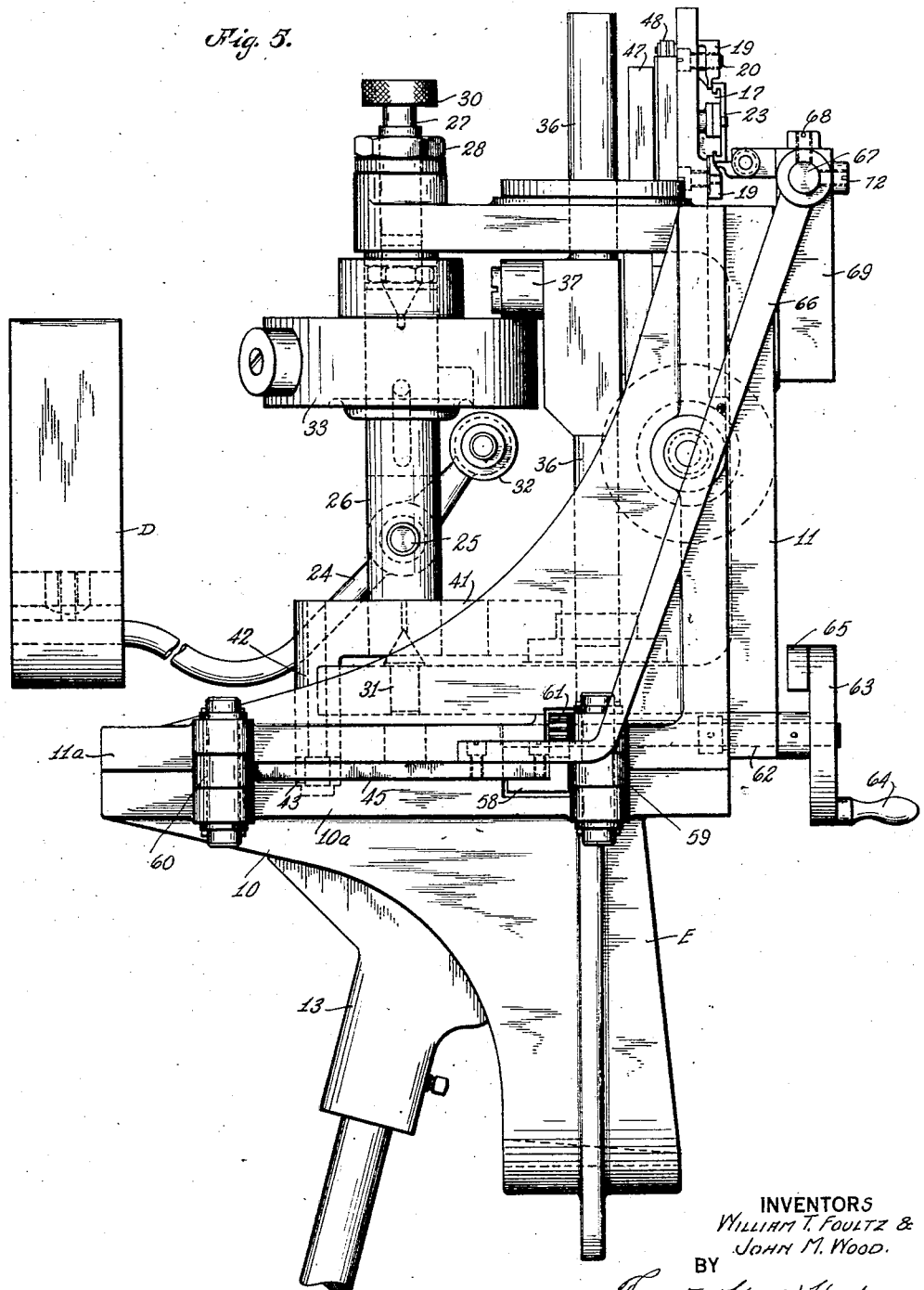

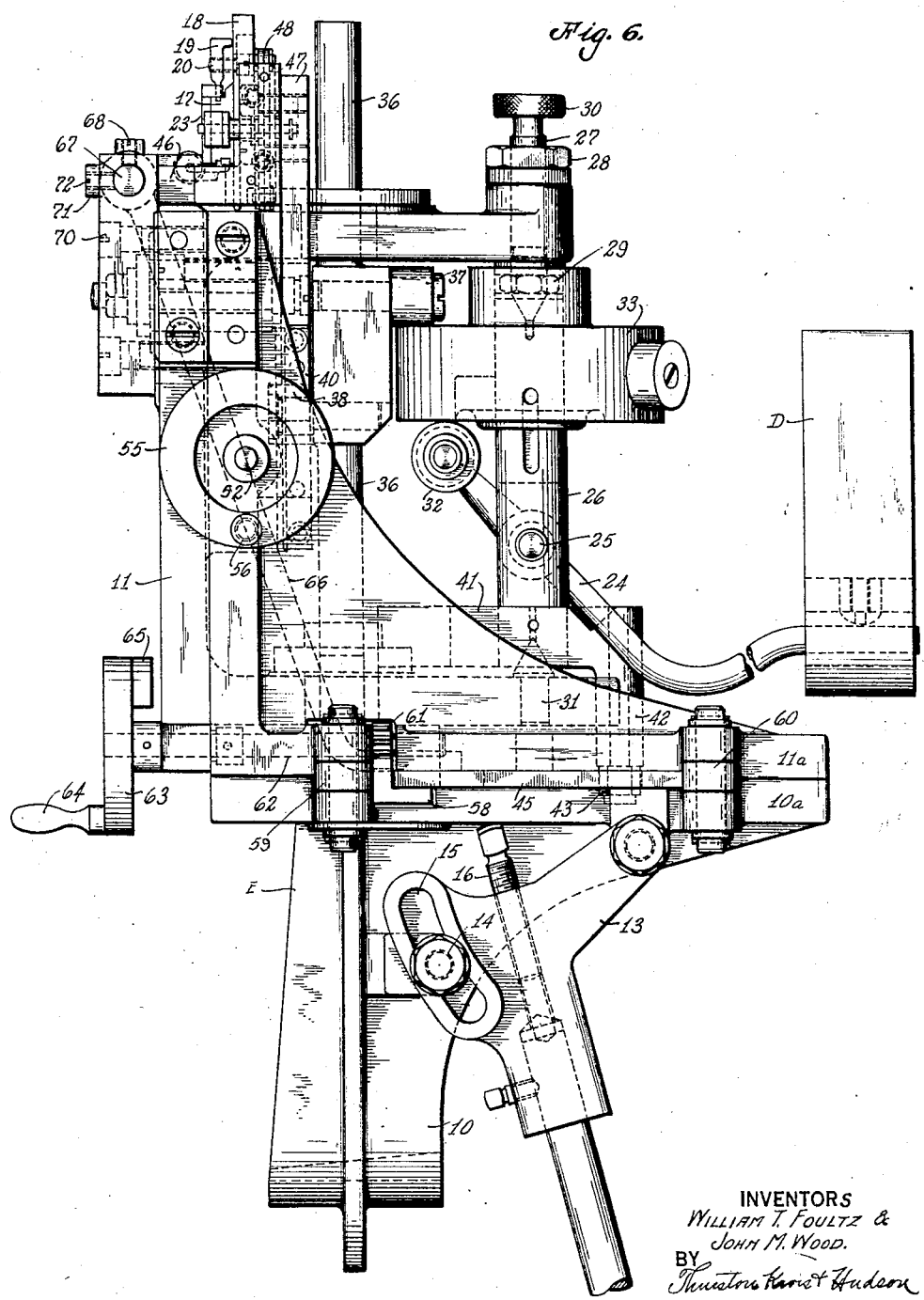

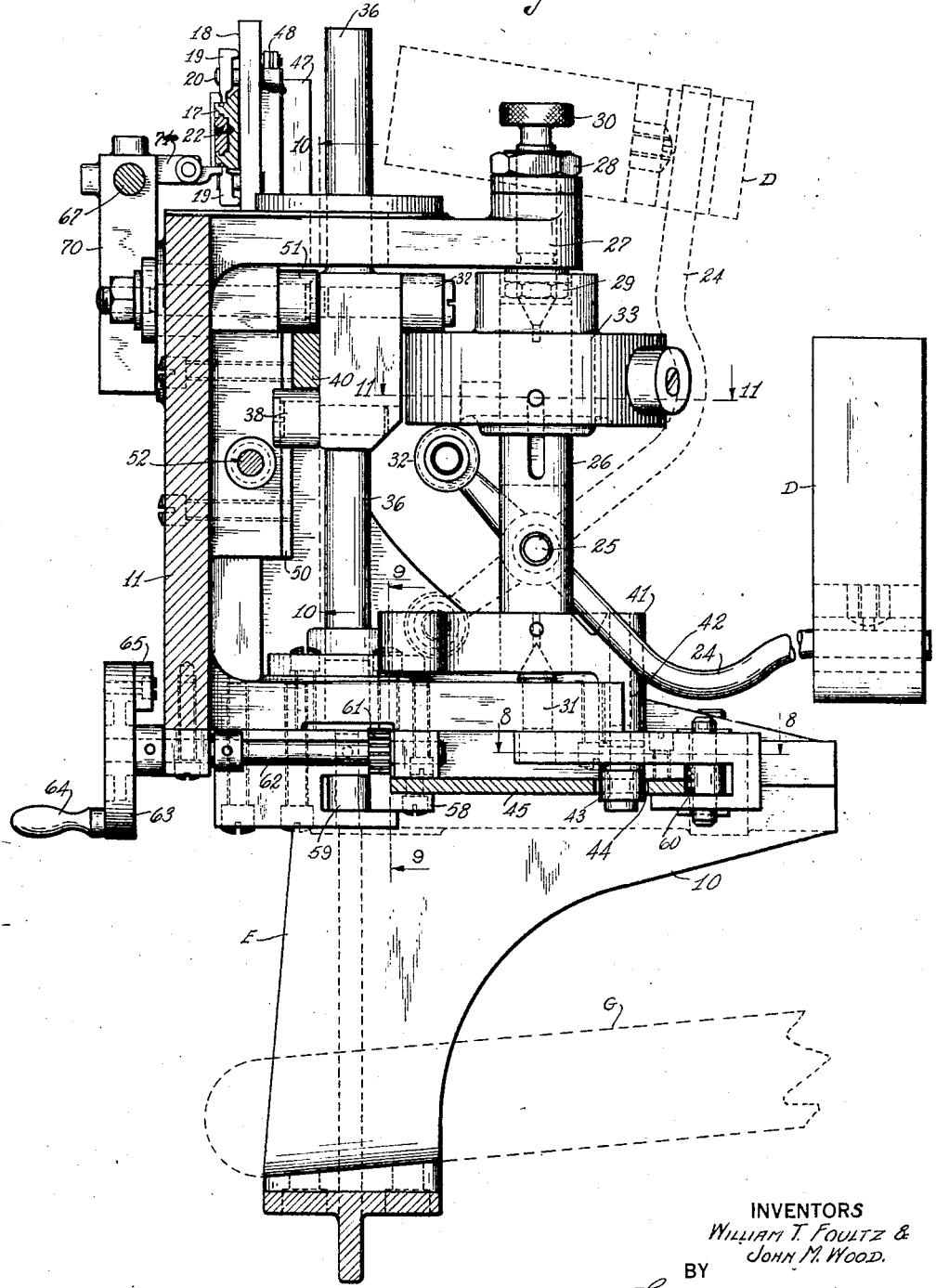

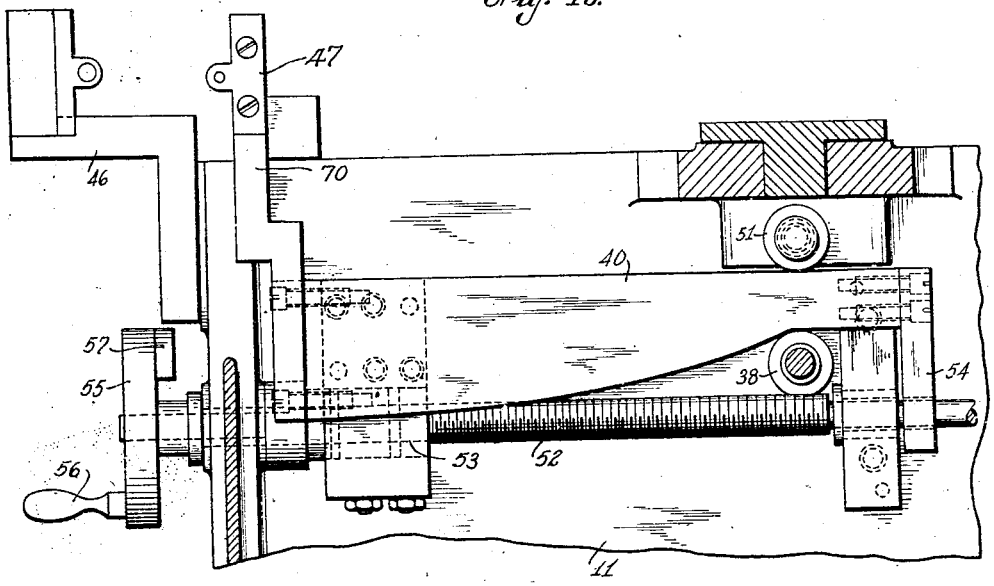
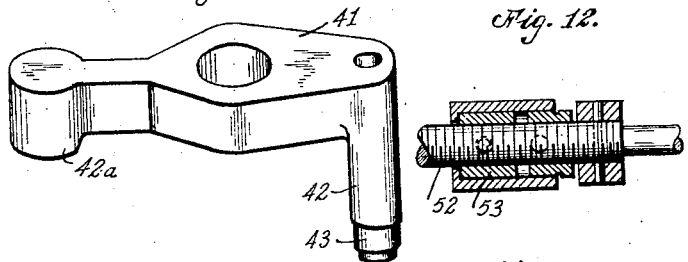
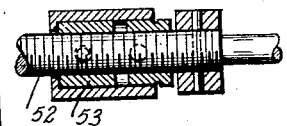
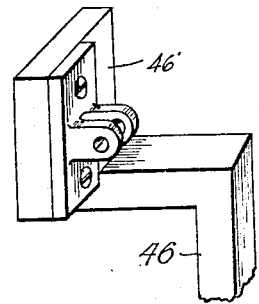
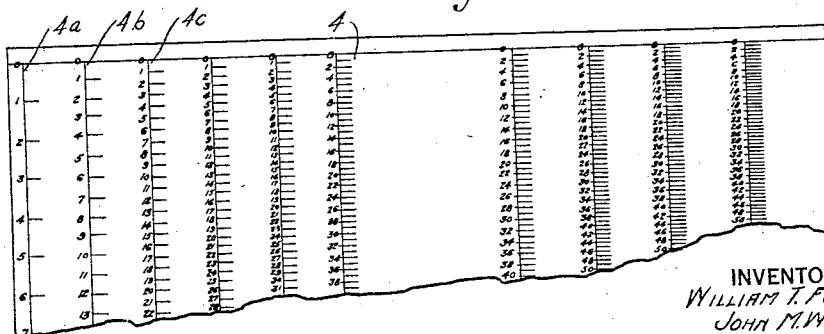
INVENTORS
WILLIAM T. FOULTZ &
JOHN M. WOOD.
BY
ATTORNEYS

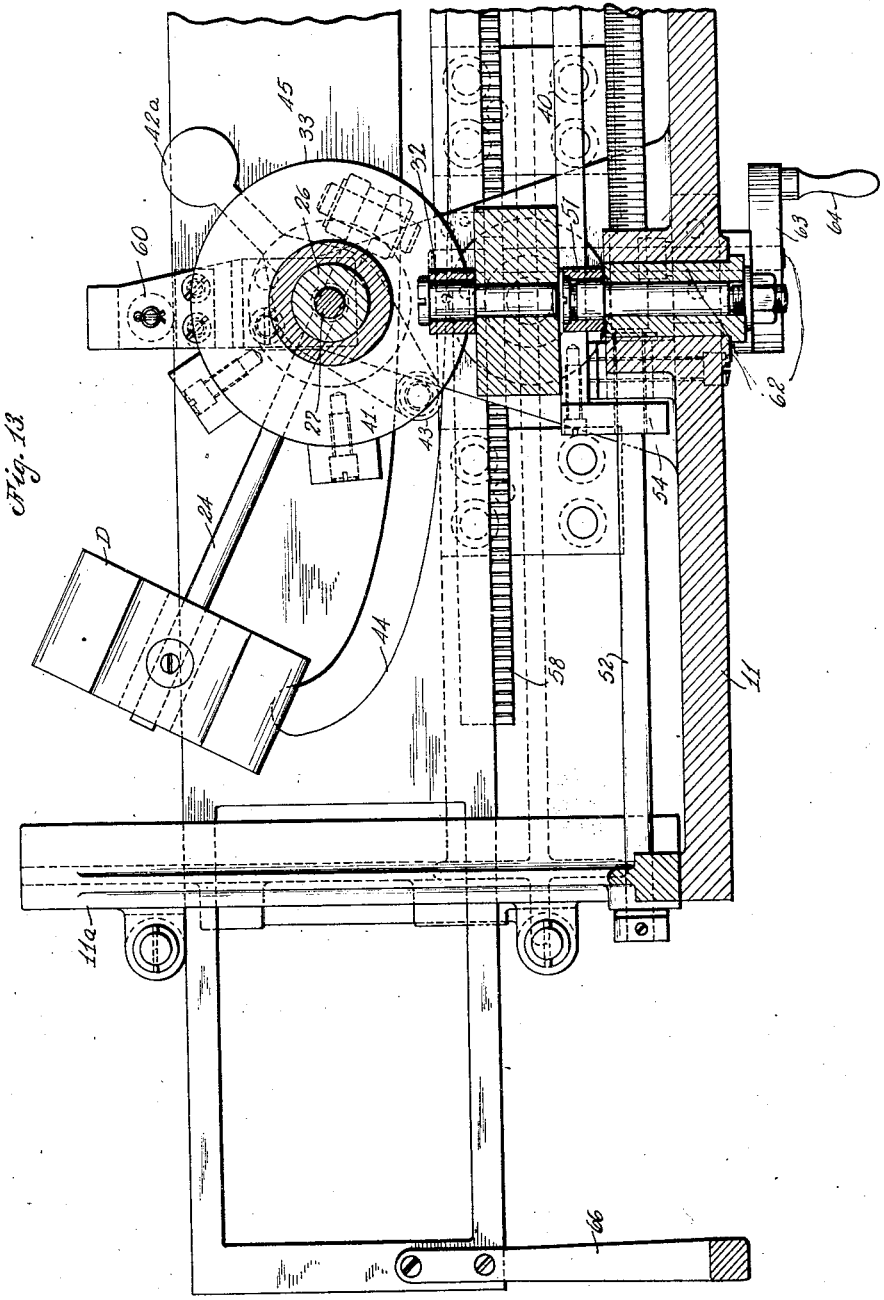

Patented Feb. 14, 1928.

1,659,357

UNITED STATES PATENT OFFICE.

WILLIAM T. FOULTZ, OF EAST CLEVELAND, AND JOHN M. WOOD, OF CLEVELAND, OHIO, ASSIGNORS TO THE WHITE MOTOR COMPANY, OF CLEVELAND, OHIO, A CORPORATION OF OHIO.

COMPUTING MACHINE.

Application filed June 15, 1923. Serial No. 645,495.

This invention relates to a computing machine designed to indicate an unknown quantity where the unknown quantity is a function of one or more variables and one or more constants, the variables being known for each particular problem and each entering the equation as a multiplier or a divisor or both.

The problem chosen to illustrate this invention deals with the calculations involved in determining a bonus award, the calculations being governed by the laws of a well known bonus system. In this system the total number of pieces produced by a workman is multiplied by a factor which is a predetermined efficiency rate or so called "standard time per piece." The product obtained is divided by the length of time worked, expressed in minutes, and the quotient is equal to the percent of the efficiency of the workmen.

The purpose of the bonus system referred to is to reward workmen attaining a certain specified percentage of efficiency and to provide a certain differential increase in the bonus award for higher efficiencies. A certain minimum bonus rate per minute is paid to workmen whose percentage of efficiency is just equal to the minimum percentage for which bonus is paid and there is a fixed increase in bonus rate for each percent over the minimum attained by the workmen. The minimum bonus rate and the differential increase are both approximately proportional to the daily wage of the particular workmen. In order to simplify the computations the workmen are grouped in a number of bonus classes in accordance with wages received. Each class has its minimum bonus rate and differential, the relation of the differential to the minimum bonus rate being the same in all classes. The bonus due each man is usually computed daily from data on department daily reports filled out by the various department clerks. This card identifies the workman and gives the number of good pieces of work completed, the standard time in minutes for a piece, i. e., the time established by principles of time study observation in which the piece should be completed by a thoroughly skilled workman, and the actual time worked in minutes, the efficiency of a workman performing the operation in the standard time being taken for the purpose of the computation as 100%. In computing the bonus from the data on a department daily report, the number of good pieces done is multiplied by the standard time per piece to find the standard time for the work done. This standard time is then divided by the actual time worked, which gives the percentage of efficiency. The minimum percentage of efficiency is then subtracted from the actual percentage and this difference is multiplied by the differential increase in rate for the particular class to which the workmen belong. To this product is added the minimum bonus rate per minute for the class and this sum is then multiplied by the actual number of minutes worked. This computation involves three multiplications, one division, one subtraction and one addition. The nature of this computation is such that it cannot be expeditiously performed on any of the calculating machines now on the market and consequently the clerical work in connection with such a bonus system when applied to a large number of workmen represents a considerable item of expense. Furthermore on account of the number of calculations it is extremely difficult to avoid errors. It has been found that the calculations can be facilitated considerably by the use of a slide rule but this method is not entirely satisfactory since the number of settings of the slide rule required makes it difficult to avoid errors and consumes more time than is desirable. The embodiment of the present invention herein illustrated is designed to facilitate computations such as above described by providing a slide rule with parts which may be set to readings corresponding to given values of the variables entering into the problem and mechanism connected to the adjustable parts of the rule which upon the proper setting of the slide rule performs the calculations involving with the variable factors all of the factors which are constant for all classes and the factors which are constant for any given class and indicates the bonus due by means of a suitable indicating device, thus by a single setting of the slide rule obtaining the bonus due and greatly decreasing both the expense incident to the computations and the liability of error.

The present invention in its broader aspects is applicable to many complex calculations other than that specifically mentioned above, as will appear as the description proceeds, and it should be borne in mind that the problem given and specific mechanism shown are merely illustrative of the invention, the form shown being the preferred form thereof for the given problem. However, the mechanism shown herein constitutes but one of the various mechanical forms in which the principle of the invention may be employed and the computation given as an illustration is but one of many which may be performed by mechanism embodying the invention.

Broadly considered, it is an object of the invention to provide means whereby a mathematical computation involving a plurality of calculations may be performed by a single setting of a computing device.

A further object is to provide means for simultaneously performing a plurality of calculations involving one or more variables and one or more constants by a single setting of the computing device.

A further object is to provide means for indicating the value of an unknown in an equation in which the unknown is the function of one or more variables and in which one or more constants enter into terms of the equation and in which a variable enters into the equation either as a multiplier or as a divisor and in which a calculation in addition to the multiplication or division is involved.

Other objects will be apparent from the following description and accompanying drawings.

In the preferred form of the invention herein shown, means are provided for obtaining the final reading upon a suitable chart mounted upon the cylinder of a computing scale which is actuated by a shiftable weight mounted upon the tare beam of the scale, the shiftable weight being actuated by suitable connections from the movable parts of a slide rule which together with the mechanism for shifting the weight is mounted upon the tare beam. The weight is caused to assume such a position that the effective force operating upon the cylinder of the scale will be a function of the variable quantities represented by the setting of the slide and runner of the rule and the chart upon the cylinder is graduated to show in separate columns the bonus due in each class for the time worked and efficiency attained, the last two quantities being the given values of the variables to which the slide rule is set.

In the accompanying drawings, Fig. 1 is a view in front elevation of the computing device; Fig. 2 is a view of the same in side elevation; Fig. 3 is a detail view in front elevation of the slide rule setting mechanism, the weight shifting arm connected to the slide being shown in dotted lines; Fig. 4 is a plan view of the weight shifting mechanism controlled by the runner of the slide rule; Fig. 5 is a detail view in side elevation showing the shiftable weight and a position of the mechanism for shifting the same; Fig. 6 is a detail view in side elevation of the mechanism shown in Fig. 5 taken from the opposite side thereof; Fig. 7 is a detail view in section of the forward portion of the weight setting mechanism, the section being indicated by line 7—7 in Fig. 1; Fig. 8 is a detail view in section showing a part of the weight setting mechanism, the section being indicated by the line 8—8 in Fig. 7; Fig. 9 is a section on the line 9—9 of Fig. 7; Fig. 10 is a detail view showing another part of the setting mechanism, the figure being partially in section, and is taken on a plane indicated by the line 10—10 in Fig. 7; Fig. 11 is a vertical section on the line 11—11 of Fig. 7; Fig. 12 is a horizontal section on the line 12—12 of Fig. 3; Fig. 13 is a horizontal section on the line 13—13 in Fig. 3; Fig. 14 is a detail view in front elevation of the end of the slide rule slide to which the actuator is attached; Fig. 15 is a top plan view of the portion of the slide rule slide shown in Fig. 14; Fig. 16 is a section on the line 16—16 of Fig. 3; Fig. 17 is a perspective view of a portion of a clamping structure used with the slide rule; Fig. 18 is a perspective of a pantograph supporting block; 19 is a perspective of the cam plate crank; Fig. 20 is a fragmentary portion of a chart, the chart being the same as shown on Fig. 1 on the upper portion of the scale and illustrating in detail the form and arrangement of the numerals comprising the chart.

Referring to the annexed drawings, the computing mechanism comprises a computing scale A provided with the usual cylinder B and tare beam C which actuates the cylinder through the usual mechanism, a shiftable weight D carried by a suitable frame E rigidly attached to the counterweight G of the tare beam and a slide rule F carried by the frame E, the movable parts of which are connected through suitable mechanism mounted within the frame E to the weight D to move the same and shift the center of gravity of the weight imposed on the tare beam in such manner that the cylinder will be turned through the proper angle to bring the desired portion of the chart thereon to reading position.

In order that the function and operation of the various parts hereinafter to be described may be the more readily understood, we will here set forth briefly the general nature of the operations mechanically performed.

The bonus computation chosen for illustration of the present invention may be stated in the form of an equation as follows:

$$X = \left[\left(\frac{100S}{A} - p\right)d + r\right]A$$

where X is the bonus in cents, S is the standard time in minutes for the work done, A is the actual time worked in minutes, $p$ is the minimum percentage for which bonus is paid, $d$ is the differential increase in cents per minute for each additional percent of efficiency, and $r$ is the minimum bonus rate in cents per minute. The terms S and A are variables, the term $p$ is constant for all computations, and the terms $d$ and $r$ are constant for all computations in the same bonus class. The terms $d$ and $r$, however, bear the same relation to each other in all bonus classes, and, for any given values of S and A, X for the different bonus classes will be directly proportional to $d$ or $r$ for the different classes, therefore, by providing graduations in columns of the chart (see Fig. 19) in which unit lengths in the various columns are inversely proportional to $r$ or $d$ for the class, a setting of the weight which will give the proper reading indicating bonus due in one class for a given time worked at a given efficiency will also give the proper reading in the other classes for the same time worked at the same efficiency. It will be obvious therefore that if means be provided for adjusting the weight D to a position in which the turning force applied to the cylinder is the proper function of S and A the cylinder will be turned through the angle required to bring to reading position the bonus in cents for each of the classes provided for, which would be due for the given time actually worked and the given standard time for performing the work done.

Bearing in mind the relationship of the values $d$ and $r$ the equation may be simplified as follows:

$$X = \left[\frac{100Sd}{A} - (pd - qd)\right]A$$

$q$ being a constant for all bonus classes $$X = \left[\frac{100S}{A} - (p - q)\right]Ad$$

$(p-q)$ being a constant for all bonus classes.

Now, if the weight be adjusted to a position in which the force applied to the cylinder gives a turning movement proportional to $$\left[\frac{100S}{A} - (p - q)\right]A,$$

the columns of the cylinder may be graduated to give the reading $$\left[\frac{100S}{A} - (p - q)\right]Ad,$$

in a manner similar to the reading in cents for a given weight at a given price per pounds in the ordinary use of a computing scale.

The position of the weight D is controlled by suitable connections, which will be hereinafter described in detail, from the slide and runner of the slide rule G, the slide at each setting thereof shifting the weight to a position in which the turning force applied to the cylinder B has a definite relationship to the quantity $$\left[\frac{100S}{A} - (p - q)\right]$$

and the runner upon each setting shifting the weight to a position in which the turning force exerted by the first setting is multiplied by a quantity having a definite relationship to A, each column of the chart being graduated to give a reading for each setting which is a product of the effective weight expressed in units and a known constant.

We will now proceed to describe in detail the mechanism employed for shifting the weight D in such a manner as to obtain a reading upon the cylinder B which bears the desired relationship to the values represented upon the slide rule F to which the runner and slide thereof are set. Referring more particularly to Figs. 1 and 2 of the drawing, the computing scale A is mounted upon a base 1 having a standard 2 at the rear end thereof and a cylinder casing 3 at the upper end of the standard 2. The cylinder casing 3 has a sight opening 5 extending along the front thereof which will be provided with a suitable line indicator such as a sight line $5^a$ indicated in dotted lines in Fig. 1 which cooperates with the graduated columns of the chart 4 (see Figs. 1 and 20) for indicating readings on the chart. The chart 4 will be provided with separate columns $4^a$, $4^b$, $4^c$, etc., graduated decimally and to units of length which are inversely proportional to the bonus rates in the different bonus classes. The computing scale A is of the usual construction, the cylinder B being provided with means offering a predetermined resistance to turning movement and being operated from the tare beam C through a suitable rack bar 6, the angular movement of the cylinder being proportional to the turning force applied thereto. The tare beam C is supported upon a suitable fulcrum 7 and is connected at its rear end through suitable mechanism (not shown) to the rack bar 6. Between the fulcrum 7 and the standard 2, the tare beam C is provided with a guide rod 8 sliding in a vertical guide in the base 1 and is connected to a dash pot 9 carried by the base 1 which serves to prevent oscillatory movements of the cylinder B. The computing scale is not herein described in detail since an old and well known form of computing scale is employed.

The shiftable weight D, the slide rule F and the operating connections between the slide rule F and the weight D are all supported upon the frame E which has a lower attaching section 10 which is U-shaped and has outwardly extending flanges 10$^a$ at the upper end thereof. The base portion 10 of the frame E is rigidly attached to the counterweight G of the tare beam forwardly of the fulcrum 7 and the upper mechanism supporting portion 11 of the frame E has its base flanges 11$^a$ bolted to the top flanges 10$^a$ of the base section 10. The weight of the frame E and the mechanism supported thereby is so distributed that when both the slide and runner of the slide rule are at their lowest settings the center of gravity of the entire mechanism supported upon the tare beam C is directly above the fulcrum 7 so that no turning force will be exerted upon the cylinder B and the zero points on the chart will be in reading position. For setting the mechanism to perfect balance, a counterweight 12 is detachably connected to a suitable arm 13 which is pivoted to the base portion 10 of the frame E beneath the flange 10$^a$, the arm 13 being held in the desired position of adjustment by means of a bolt 14 which is carried by the base portion 10 of the frame and extends through an arcuate slot 15 in the arm 13. For accurately adjusting the weight 12 a screw 16 is threaded into the top portion of the arm 13 and has a squared head which is adapted to bear against the underside of the flange 10$^a$. By slightly loosening the bolt 14 and turning the screw 16, the weight 12 may be adjusted to a position such that the center of gravity of the mechanism supported upon the tare beam C will lie exactly in the vertical plane of the fulcrum as will be indicated by the zero readings on the chart.

Referring particularly to Figs. 1, 3 and 15, the slide rule F has a fixed body portion 17 which is provided with the usual logarithmic graduations and is rigidly secured to the top portion of the upper section 11 of the frame E by means of brackets 18 which carry adjustable clamps 19 that are secured thereto by means of screws 20 extending through vertical slots 21 in the brackets. The body 17 extends across the outer side of the frame E at the top thereof with its graduations exposed to view throughout its length. The body 17 is provided with a groove throughout the length thereof in which is fitted the slide 22 also provided with the usual logarithmic graduations, so that, when a given reading on the slide is aligned with a given reading upon the body, a unit graduation of the slide will be aligned with the reading upon the fixed body 17 which indicates the quotient of the reading on the body and the reading on the slide which have been aligned with each other. In the problem taken as an illustration the reading on the slide representing the number of minutes actually worked will be aligned with a reading on the body representing the standard time in minutes for the work done and the reading on the body 17 which is aligned with a unit or ten graduation on the slide will indicate the percentage of efficiency. The slide rule F is also provided with a runner 23 which is of the usual form provided with a glass plate overlying the body and runner and having a hairline to indicate the position thereof with respect to the graduations on the rule. The runner 23 is slidably mounted in front of the fixed body and is adjustable to any position along the length thereof. The runner 23 may be employed to facilitate the correct alignment of the selected readings upon the body and slide of the rule and, as will be hereinafter explained, may be adjusted into alignment with a desired reading on the fixed body to effect a multiplication.

Referring particularly to Figs. 2, 5, 6, and 7, the weight D is rigidly attached to the rear end of an arm 24 which is supported upon a horizontal pivot 25 in a vertical rotatably mounted post 26 which is supported in the upper portion 11 of the frame E directly over the fulcrum 7. The post 26 has a conical recess in its upper end which receives the conical point of a vertically disposed bearing pin 27 which is secured in a fixed part of the frame overhanging the top of the post 26. The body of the pin 27 is screw threaded and carries nuts 28 and 29 engaging the top and bottom of the support which serve to hold the pin in adjusted position. The pin 27 is also provided with a knurled head 30 by means of which it may be turned to regulate the pressure exerted by the point thereof upon the standard 26. At its lower end the post 26 has a conical recess which fits upon the conical point of a lower bearing pin 31 which is fixed in the base portion of the frame section 11 as best shown in Figs. 6 and 7. The arm 24 extends through a vertical slot in the post 26 and projects forwardly therefrom. A pair of rollers 32 are carried by the forward end of the arm 24 and are engaged by the flat under surface of a follower 33 in the form of a heavy disk slidable upon the post 26. The follower 33 serves as a counterbalance for the weight D so that only a small force is required to swing the weight D vertically about the pivot 25. The weight D, however, overbalances the weight of the follower 33 so that the follower is normally held in its uppermost position by the weight D. The follower 33 is moved downwardly to swing the weight D vertically by means of a vertically movable slide 36 which has a roller 37 bearing upon the top face of the follower 33. The slide 36 is disposed at the front of the post 26 and has a roller 38 on the front side thereof which is engaged by the curved lower edge of a cam plate 40 (see Fig. 10) which is so connected to the slide 22 that its movement is proportional to the movement of the slide. The curvature of the cam 40 is such that the movement of the weight taken along the longitudinal axis of tare beam for various settings of the slide is proportional to a predetermined function of the variable to which the slide is set.

Adjacent its lower end the post 26 has an arm 41 rigidly attached thereto intermediate its ends, the arm 41 having a depending projection 42 at one end and a counterweight 42ª at its opposite end which counterbalances the weight of the projection 42. The projection 42 carries a roller 43 at its lower end which engages in a cam slot 44 (see Fig. 8) formed in a horizontally disposed cam plate 45 which is slidably mounted between the sections 10 and 11 of the frame E and is rigidly connected with the runner 23 for movement therewith. The post 26 is turned by the cam plate 45 in the movement thereof to swing the weight D laterally about the axis of the post 26.

The zero position of the weight D is that shown in Fig. 2 of the drawing i. e. with the arm 24 extending rearwardly toward the standard 2 and the weight D in its lowermost position.

After the weight D has been adjusted by one cam about either of its axes of rotation to any angle from zero position, a subsequent adjustment through a given angle about the other axis will shift the weight toward or from the fulcrum a distance which is always the same fractional part of the distance of the weight from the fulcrum in its first position of adjustment. Thus the runner 23 in its movement from any unit graduation of the body 17 to the next succeeding unit graduation thereof shifts the weight about its vertical axis a distance toward the fulcrum which is one decimal part of the total movement of the weight toward and from the fulcrum regardless of the angular adjustment of the weight about its horizontal axis. The weight D in its movement in the direction of the longitudinal axis of the tare beam shifts the center of gravity of the entire mass supported upon the tare beam a distance proportional to its movement. If the cams 40 and 45 are so designed that as either the slide or runner move from one unit graduation on the fixed body to the next, the weight D will be shifted through a corresponding decimal fraction of the movement which would be caused by moving the slide or runner the full length of the body of the slide rule, the movement of the weight due to the combined action of the slide and runner, will be a decimal part of the entire movement thereof which is proportional to the product of the predetermined functions of the two variables and by selecting suitable constants for the multiplication on the chart, the desired function of the two variables will be brought to reading position in the various columns of the chart. In other words, the cams 40 and 45 are so designed that the movements of the slide and runner which are proportional to the logarithms of the selected variables cause movements of the weight with respect to the longitudinal axis of the tare beam which are proportional to the quantities represented by the settings of the slide and runner.

We will now describe the operating connections between the two cam plates 40 and 45 and the slide 22 and runner 23. Referring particularly to Figs. 1, 3 and 10, a bracket 46 is secured to an end of the frame section 11 at the top thereof, the upper portion of the bracket 46 being spaced outwardly beyond the end of the slide rule F. The cam plate 40 has an arm 47 fixed to its outer end which projects upwardly behind the slide rule F. The arm 47 is connected to the upper end portion of the bracket 46 by means of a lazy tongs 48 which is constructed in four sections, one end being attached to the bracket 46 and the other to the arm 47. The slide 22 projects beyond the body 17 of the rule in front of the lazy tongs 48 and is connected to the third central pivot of the lazy tongs from the arm 47. By means of this connection the movement of the slide 22 is always one fourth of the movement of the cam plate 40. The cam plate 40 as shown in Fig. 7 is guided between the vertical slide 36 and a plate 50 which is rigidly secured to the frame as shown in Fig. 7. The cam plate 40 has a straight upper edge which is engaged by a roller 51 carried by the frame 11. For computing the bonus awards it is not necessary that the slide 22 have a movement throughout the full length of the body 17 since the computation will be made only between the minimum percentage of efficiency and the highest percentage which it is possible for a workman to attain. It is, moreover, desirable to limit the movement of the slide 22 in one direction so that it will be impossible to register a bonus for efficiencies lower than the minimum. To this end the lazy tongs connection 48 is so proportioned that the slide cannot move to a position which will register an efficiency lower than the minimum. The cam plate 40, as shown in Fig. 3 is shifted longitudinally and guided by means of a horizontal shaft 52 immediately below the plate and parallel therewith.

The shaft 52 has a threaded portion which is received by a nut 53 which is rigidly secured to the outer end of the cam plate 40. The cam plate 40 at its other end has a depending arm 54 through which the shaft 52 passes, the portion of the shaft engaging the arm 54 being unthreaded and having a sliding fit in the arm. At the end of the shaft 52 which projects beyond the outer end of the cam plate 40 there is a hand wheel 55 which is fixed thereto outside the frame, the hand wheel 55 being provided with a suitable handle 56 and a counterweight 57 which balances the handle. By rotating the shaft 52 the cam plate 40 is moved longitudinally thereof and the slide 22 moves one fourth the distance that the plate is moved. Means are thus provided for obtaining a very accurate setting of the slide with respect to the body of the rule.

The horizontally disposed cam plate 45 has a rack bar 58 rigidly attached to the outer edge thereof and is guided between guide rollers 59 and 60 engaging the inner edge of the plate and the outer edge of the rack bar. The rack bar 58 is engaged by a pinion 61 which is fixed to a horizontal shaft 62 which extends through the front of the frame E and carries a hand wheel 63 at its outer end, the hand wheel 63 being provided with a suitable handle 64 and a counterweight 65 for balancing the handle in all positions of the wheel. An arm 66 outside one end of the frame E is rigidly attached at its lower end to the projecting end of the cam plate 45 and at its upper end to a horizontal rod 67 by means of set screws 68. The horizontal rod 67 is positioned immediately below the slide rule F and is slidable in brackets 69 and 70 carried by the frame. A bracket 71 is rigidly connected to the horizontal rod 67 by means of set screw 72 and carries a hook bolt 73 (Fig. 4) in which the runner 23 is secured. By turning the shaft 62 the runner 23 may be quickly and accurately adjusted and the cam plate 45 moved through a distance exactly equal to the movement of the runner.

The cam 40 is so designed that the shifting movement of the weight about its horizontal axis is proportional to the function of the percentage of efficiency to which the slide is set expressed by the formula $$\left[\frac{100S}{A} - (p-q)\right].$$

The cam 45 is so designed that the movement of the weight with respect to the fulcrum due to its movement about its vertical axis is proportional to the reading on the body 17 to which the runner 23 is set. The movement of the weight with respect to the fulcrum due to the action of both cams is proportional to the product of the reading to which the runner is set and the function of the percentage of efficiency represented by the formula $$\left[\frac{100S}{A} - (p-q)\right].$$

The graduations of the various columns of the chart are so related to the turning movement of the cylinder per unit of weight that the reading in each column is the product of the proper constant for the class which the column represents and the effective turning force exerted by the weight upon the cylinder to give the correct reading in cents for the percentage of efficiency attained and the actual time worked.

As will be readily understood by those skilled in the art, the curve for each of the cams may be laid out by graphical methods, since the coordinates at any point thereof will be determinate functions of a variable and the curve of each of the cams so laid out may be such as to proportion the movement of the weight to any function of the variable which is continuous between the limits of the values to be assigned to the variable. The independent movement of the weight about a plurality of axes permits the weight to have a movement due to the combined action of a plurality of cams which is proportional to the product of the functions of the variables which determine the curvature of the cams.

In the operation of the device the operator will first determine the standard time for the work done by multiplying the number of pieces done by the standard time per piece as shown by the time report of the workman whose bonus is being computed. This is usually a simple operation which can be performed mentally. The operator then shifts the runner 23 by means of the hand wheel 63 to position the hair line thereof over the graduation on the body 17 of the slide rule corresponding to the standard time in minutes. The slide 22 is then shifted by means of the hand wheel 55 until the graduation thereon corresponding to the actual time worked in minutes is aligned with the hair line of the runner 23 and with the graduation on the body 17 which correspond to the standard time for the work done. The reading on the body 17 opposite a unit or tens graduation on the slide will indicate the percentage of efficiency which if desired may be noted on the time card. The runner will then be shifted to align the runner with the reading on the body 17 which corresponds to the actual time worked. The readings in each column of the chart will now be the bonus due in cents in each class for the actual time worked and percentage of efficiency attained.

Having described our invention, we claim—

1. The combination with a graduated rule having a plurality of parts independently adjustable to indicate different readings thereon, of a graduated chart having a series of graduated columns, and means connected to the adjustable parts of the first mentioned member for indicating in the several columns of the chart a series of functions of the readings upon the first member.

2. The combination with a slide rule having a slide and runner, of a graduated member independent of the slide rule, and means connected to the slide and runner for indicating upon said second member a reading which is a function of the readings to which said slide and runner are set.

3. The combination with a slide rule having a slide and runner, of a chart having a series of graduated columns, and means connected to said slide and runner for indicating in each column of the chart a different function of the two readings to which the slide and runner are set.

4. The combination with a slide rule having a graduated body and a graduated slide, of a graduated member separate from the slide rule, and means connected to the slide for indicating upon said graduated member a reading which is a function of a reading on the slide and a reading on the body which are in alignment.

5. The combination with a slide rule having a graduated body and a graduated slide, of a chart having a series of differently graduated columns, and means connected to the slide for indicating upon each column of the chart a different function of two quantities represented by readings upon the slide and body which are in alignment.

6. The combination with a slide rule having a graduated body, a graduated slide and a runner, of a graduated member separate from the slide rule, and means connected to both the runner and slide for indicating upon said graduated member a reading which is a function of the quantities indicated by the setting of the slide and runner upon the body of the slide rule.

7. The combination with a cylinder having a chart thereon, said chart having a series of circumferentially graduated columns, of means indicating a reading line across the chart at one side of the cylinder, a graduated member, means manually adjustable along the graduated member to different readings thereon, and means connected to the manually adjustable means for turning said cylinder to bring to reading position in each column, a graduation which indicates a quantity which is a function of the reading upon the graduated member.

8. The combination with a slide rule having a body and slide both provided with logarithmic graduations, of a member separate from the slide rule graduated to uniform units of length, means for indicating readings upon the graduated member, and means connecting the slide to said last mentioned means for causing the same to indicate a reading which is a function of the quotient indicated by the setting of the slide.

9. The combination with a slide rule having a body and slide both with logarithmic graduations thereon, of a cylinder having thereon a chart with separate columns thereon, each graduated in units of uniform length, the unit graduations of the columns varying in length, means at one side of the cylinder for indicating a reading line across the columns of the chart, and means connecting the slide and cylinder to turn the cylinder to bring to reading position in each column a function of the quotient indicated by the setting of the slide.

10. The combination with two contiguous graduated members, one adjustable along the other whereby any given graduation on one may be aligned with any given graduation upon the other to determine by other aligned graduations a quantity which is a function of the two quantities represented by the two aligned graduations, of a third graduated member separate from the first mentioned member and means connected to the adjustable member for indicating upon the third graduated member a second function of the two quantities represented by the aligned graduations.

11. In a computing machine, the combination with a computing device having relatively movable parts adapted to be set in accordance with selected values of two variables and to indicate a certain function of said variables, of an indicating device separate from said computing device, and means actuated by a movable part of said computing device for indicating on said indicating device a different function of said variables.

12. In a computing machine, the combination with a computing device having relatively movable parts adapted to be set in accordance with selected values of two variables, of an indicating device, and means actuated by a movable part of said computing device for indicating on said indicating device a function of said variables in which a constant enters as a factor.

13. In a computing machine, the combination with a computing device having relatively movable parts adapted to be set in accordance with selected values of two variables, of an indicating device, and means actuated by a movable part of said computing device for indicating on said indicating device a function of said variables in which a plurality of constants are factors.

14. In a computing machine, a computing device adapted to be set in accordance with selected values of two variables, of a chart having a series of graduated columns, and means connecting the computing device and chart for indicating readings in the various columns of the chart each reading being the product of a function of the two variables and a predetermined constant.

15. In a computing machine, a chart having a series of columns, means for indicating a reading line across the columns of a chart, a computing device adapted to be set to different adjustments in accordance with selected values of two variables, means connecting the computing device to the chart to move the same to different positions with respect to the line indicating device, the movement of the chart being so related to the setting of the computing device that the reading in each column is a predetermined function of the two selected variables to which the computing device is set.

16. In a computing machine, a computing device having relatively movable parts adapted to be set to different adjustments in accordance with selected values of two variables and means associated with said parts for simultaneously indicating a plurality of different functions of the selected variables one of said functions so indicated being a summation of a plurality of products in which said variables are factors.

17. In a computing machine, a computing device having relatively movable parts adapted to be set to different adjustments in accordance with selected values of two variables, and means associated with said parts to simultaneously indicate the quotient of the selected variables and a function of the two variables comprising a summation of a plurality of products in which said variables are factors.

18. In a computing machine, a slide rule having a body and slide provided with logarithmic graduations, said slide being adjustable on the body to indicate the quotient of the selected values of two variables, a runner adjustable on the body to positions corresponding to selected values of a variable, an indicating device separate from the slide rule, means connecting the slide to said device to cause the same to indicate a function of the quotient, and means connecting the runner to the indicating device to cause the same to indicate a product in which said function of the quotient and the selected value to which the runner is set are factors.

19. In a computing machine, the combination with a computing scale having a rotary graduated cylinder and a tare beam operatively connected to the cylinder, of a weight on the tare beam adjustable longitudinally thereof, and a slide rule having an adjustable part thereof connected with the weight to shift the same.

20. In a computing machine, the combination with a computing scale having a rotary graduated cylinder and a tare beam operatively connected to the cylinder, of a weight on the tare beam adjustable longitudinally thereof, and means for adjusting said weight including a graduated member having a part adjustable to different readings thereon, said part being connected to said weight.

21. The combination with a computing scale having a rotary cylinder with a series of circumferential graduated columns and a tare beam operatively connected with said cylinder to turn the same, of a mechanism carried by the tare beam, comprising a weight shiftable longitudinally of the tare beam, a slide rule having a slide and runner and independent operative connections between said weight and said slide and runner.

22. The combination with a computing scale having a rotary cylinder with a series of circumferential graduated columns, and a tare beam operatively connected with the cylinder to turn the same, of a weight on the tare beam mounted to swing vertically and laterally to vary the turning force exerted on the cylinder, a graduated member mounted on the tare beam, a pair of members mounted for movement along the graduated member, means for connecting one member of said pair to the weight to swing the same vertically, and means connecting the other member of the pair to the weight to swing the same laterally.

23. The combination with a computing scale having a tare beam and a graduated cylinder connected to the tare beam, said cylinder having a turning movement proportional to turning force exerted thereon by the tare beam, a weight mounted on the tare beam, said weight being movable about a vertical axis and also about a horizontal axis, separate means for swinging said weight horizontally and vertically, means for indicating the extent of movement of the weight about its vertical axis and means for indicating the extent of movement of the weight about its horizontal axis.

24. The combination with a computing scale having a counterweighted tare beam and a graduated cylinder actuated by the tare beam, of a slide rule mounted on the tare beam, and means connected to a movable part of the slide rule for varying the turning force exerted by the tare beam upon said cylinder.

25. The combination with a computing scale having a graduated cylinder adapted to be turned through an angle proportional to the turning force exerted thereon and means for transmitting a turning force to the cylinder, of a slide rule, and a counterweight connected to said cylinder and to a movable part of the slide rule for varying the turning force exerted on the cylinder.

26. The combination with a computing scale having means for registering a series of values proportional to the leverage of a given weight imposed on the scale, of a slide rule mounted on the scale, and means connected with a movable part of the slide rule for varying the leverage between the weight and indicating means.

27. The combination with a computing scale having movable means for registering a series of values proportional to the effective force applied thereto by a weight on the scale, a graduated member mounted on the scale, means movable along the graduated member, and means connected to the last mentioned means for varying the turning force exerted on the cylinder.

28. The combination with a computing scale having a tare beam and a graduated cylinder operated by the tare beam and registering a series of values proportional to the turning force exerted thereon through the tare beam, of a slide rule mounted on the tare beam, a vertical post rotatably mounted upon the tare beam, said post being superposed over the fulcrum of the tare beam, an arm connected by a horizontal pivot to the post, a weight carried by the arm, means connecting the slide rule slide with said weight to swing the same vertically, and means connecting the slide rule runner with the weight to swing the same laterally.

29. The combination with a computing scale having a tare beam and a graduated cylinder operated by the tare beam and adapted to register a series of values proportional to the turning force exerted thereon through the tare beam, of a weight mounted on the tare beam to swing about horizontal and vertical axes, means for swinging the weight vertically and for indicating the extent of such movement, and means for swinging the weight horizontally and for indicating the extent of such movement.

30. The combination with a computing scale having a tare beam and a graduated cylinder operated by the tare beam and adapted to register a series of values proportional to the turning force exerted thereon through the tare beam, of a computing device mounted on the tare beam which is adapted to be set in accordance with selected values of a plurality of variables, a shiftable weight on the tare beam and means connecting the weight to the computing device to shift the same with respect to the fulcrum of the beam a distance proportional to a given function of the variables for which the computing device is set.

31. The combination with a slide rule having a graduated body and a graduated slide movable along the body whereby graduations on the body and slide representing selected values of two variables may be aligned, of means for simultaneously indicating the quotient of the two selected variables and a function of the two variables which comprises a summation of a plurality of products, and means for preventing the registry of said function when the quotient falls below a predetermined value.

32. In a computing machine, the combination with a slide rule having a graduated body and a graduated slide and a runner adjustable along the body, a cam connected for movement with the slide, a cam connected for movement with the runner, and an indicating device operated by said cams.

33. In a computing machine, the combination with a slide rule having a graduated body and a graduated slide and a runner adjustable along the body, cams movable with the slide and runner, a shiftable member operatively connected to both cams and an indicating device operated by said shiftable member.

34. In a computing machine, a computing device having adjustable parts adapted to be set to various positions of adjustment determined by selected values of a plurality of variables, a member which is mounted for angular movement about intersecting axes of rotation, an operating connection between each adjustable part and said member, each operating connection being adapted to turn the member about one of its axes of rotation through an angular distance which is a predetermined function of the variable which determines the adjustment of the part, and an indicating device associated with said member which for each setting of the computing device indicates a predetermined function of the variables indicated by the adjustable parts of the computing device.

35. In a computing machine, the combination with a computing scale having a graduated cylinder, the rotative movement of which is proportional to the turning force exerted thereon, a tare beam, and a weight mounted to swing about axes which intersect directly over the fulcrum, a computing device mounted on the tare beam and having adjustable parts adapted to be set to various positions of adjustment determined by selected value of a plurality of variables, an operating connection between each adjustable part of the computing device and said weight to turn the same about an axis of rotation to shift the weight toward and from the fulcrum, the component of the movement of the weight about each of its axes taken on the axis of the tare beam being a predetermined function of the variable indicated by the adjustable part controlling the movement of the weight about the particular axis.

In testimony whereof, we hereunto affix our signatures.

WILLIAM T. FOULTZ.
JOHN M. WOOD.